A. C. TAYLOR.
ELECTRIC WELDING MACHINE.
APPLICATION FILED AUG. 7, 1911.
1,066,682.
Patented July 8, 1913.
2 SHEETS—SHEET 1.
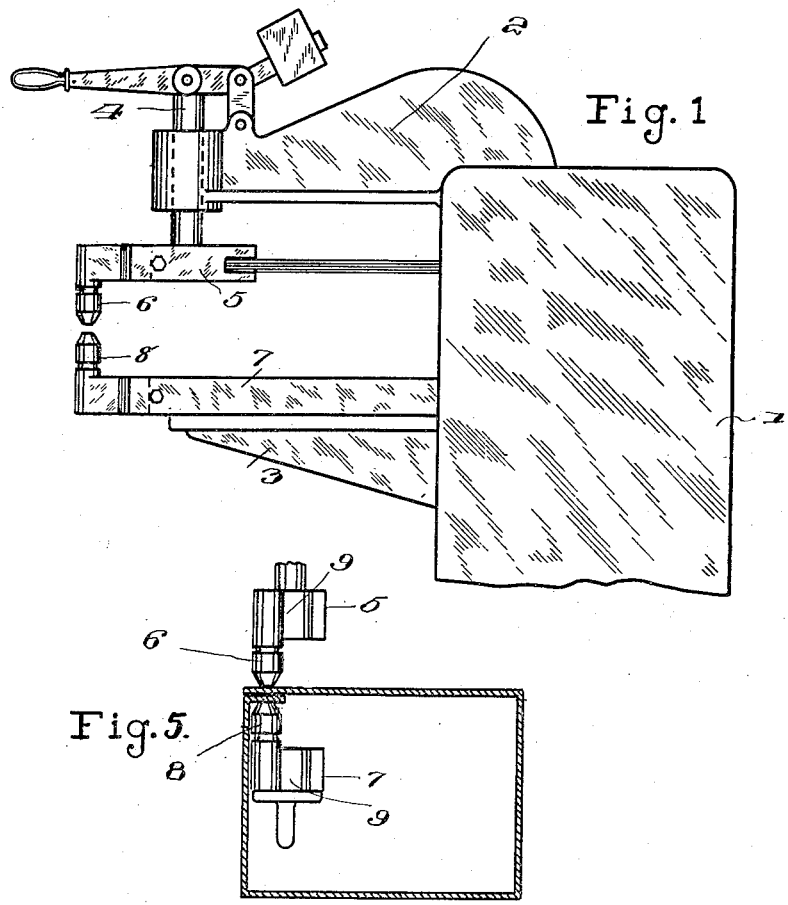
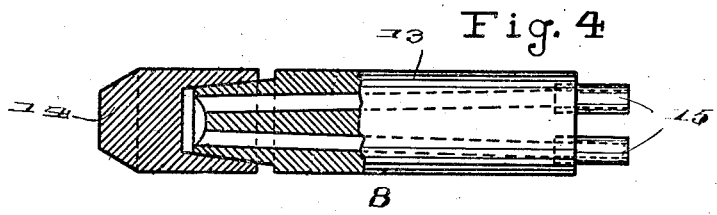

A. C. TAYLOR.
ELECTRIC WELDING MACHINE.
APPLICATION FILED AUG. 7, 1911.
1,066,682.
Patented July 8, 1913.
2 SHEETS—SHEET 2.
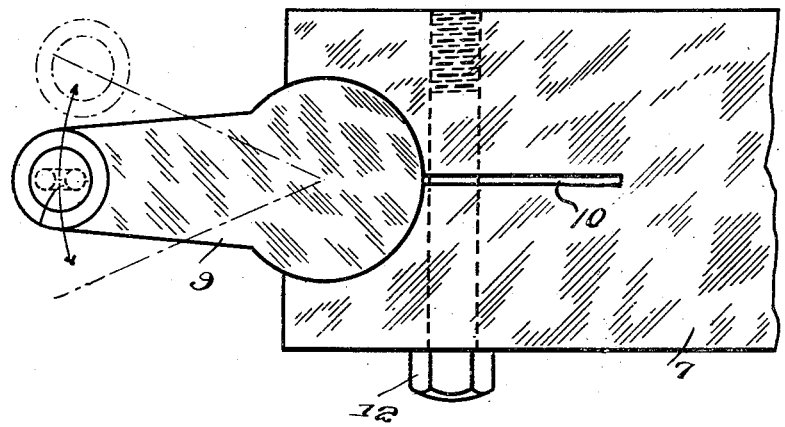
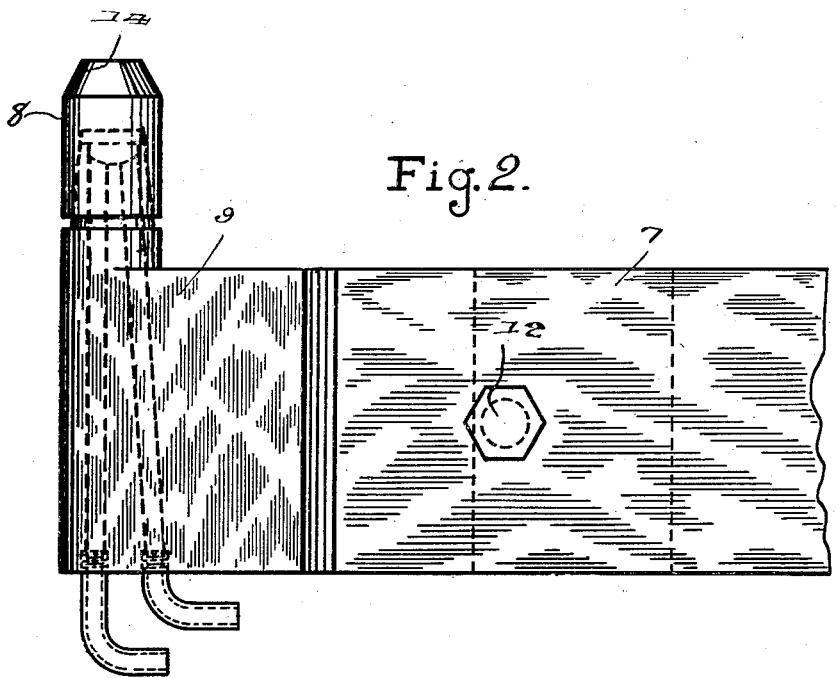

UNITED STATES PATENT OFFICE.

ALBERTIS C. TAYLOR, OF WARREN, OHIO, ASSIGNOR TO THE NATIONAL ELECTRIC WELDER COMPANY, OF WARREN, OHIO, A CORPORATION OF OHIO.

ELECTRIC WELDING-MACHINE.

1,066,682.  Specification of Letters Patent.  Patented July 8, 1913.

Application filed August 7, 1911. Serial No. 642,707.

*To all whom it may concern:*

Be it known that I, ALBERTIS C. TAYLOR, a citizen of the United States of America, residing at Warren, in the county of Trumbull and State of Ohio, have invented certain new and useful Improvements in Electric Welding-Machines, of which the following is a specification.

The primary object of this invention is to enable the electrodes of an electric welding machine to be readily and easily adjusted according to the nature of the work or the shape of the article to be welded.

In the accompanying drawings, Figure 1 shows the upper portion of a spot-welding machine provided with my improvements. Fig. 2 is an enlarged side elevation of the lower electrode and its support. Fig. 3 is a plan view of Fig. 2. Fig. 4 shows in elevation and section one of the electrodes. Fig. 5 is a diagrammatic view showing electrodes as employed for welding a rectangular box.

Referring to the drawings, 1 designates a portion of an electric welding machine from which extend horizontally disposed horns 2 and 3. The horn 2 carries a plunger 4, which may be of known construction, and on the lower end of this plunger is a support 5 for the upper electrode 6. To the lower horn 3 is secured a support 7 for the lower electrode 8.

Each of the supports 5 and 7 has secured to its outer end a radially-movable electrode holder 9. These holders are shown in form of arms swiveled to their respective supports, so that by a rocking motion the electrodes may be differently positioned in respect to their supports. Preferably, each holder is rounded at its inner end to fit in a socket formed in the end of its respective support, such socket being slightly greater than semi-circular, and the side members of the socket are capable of being drawn toward each other to firmly bind the electrode holders in the different positions they may be caused to occupy. For this purpose the supports may be slitted, as at 10, Fig. 3, the slits extending inwardly from the sockets, and the sides of each slitted portion are connected by a pin-like member, which is shown in the form of a headed bolt 12, by adjusting which the electrode holders may be released or secured.

In their outer ends the holders 9 have heads to accommodate the dies or electrodes. While these dies or electrodes are preferably separable from their holders, yet if desired, they may be integral parts thereof.

I have shown the electrodes as having reduced tapered ends whereon are fitted removable caps 14, and I have also shown the electrodes as having tubes 15 for providing a circulation of water whereby the caps may be cooled, but these features constitute the subject matter of a divisional application for patent, Serial No. 668,418, filed December 29, 1911, and hence further reference thereto is unnecessary.

The advantages of my present invention will be readily appreciated by those skilled in the art. It will be seen that by means thereof the electrodes may be readily positioned by radially moving the arms constituting the electrode holders, which latter rock in their respective supports. Hence it is unnecessary to provide different sets of electrodes or different sets of holders when the articles being welded have to be variously positioned relative to the electrodes. This is especially true with boxes which require to be welded at different sides or corners. The adjustment of the electrode holders into different positions may be readily effected by loosening the bolts 12.

It will be understood that my invention is not confined to the specific construction or arrangement herein described, and that changes may be made without departing from the invention as defined by the claims.

I claim as my invention:

1. In a welding machine, electrodes radially movable in the ends of supporting arms therefor.

2. In a welding machine, electrodes, supports therefor, said electrodes being radially movable relatively to said supports, and means for holding said electrodes in various positions.

3. In a spot-welding machine, swiveled electrodes rocking in supporting arms therefor.

4. In a spot-welding machine, electrodes, holders for the electrodes, supports therefor, said holders being swiveled to said supports, and means for retaining the holders in various positions.

5. In an electric welding apparatus, a die or electrode carrying head, means carrying such head for swivel movements, and a die or electrode carried by said head at one side of its turning axis.

6. In an electric welding machine, a die or electrode, and an arm carrying said die or electrode and attached to the machine for oscillatory adjusting movements relative thereto.

7. In an electric welding machine, a plunger, an arm attached to the plunger for pivotal movements relative thereto, means for securing the arm in adjusted positions relative to the plunger, and a die or electrode carried by said arm.

8. In an electric welding machine, a plunger, an arm attached thereto for oscillatory adjusting movements, a pin-like member coöperating with said plunger and arm to retain the same in adjusted relation, and a die or electrode carried by said arm for swinging movements therewith.

In testimony whereof I affix my signature in presence of two witnesses.

ALBERTIS C. TAYLOR.

Witnesses:
R. RENFTLE,
J. B. COLE.